March 17, 1953  A. C. BODY  2,632,079
MEANS AND METHOD FOR ELECTRIC SEAM WELDING
Filed Nov. 30, 1950  3 Sheets-Sheet 1
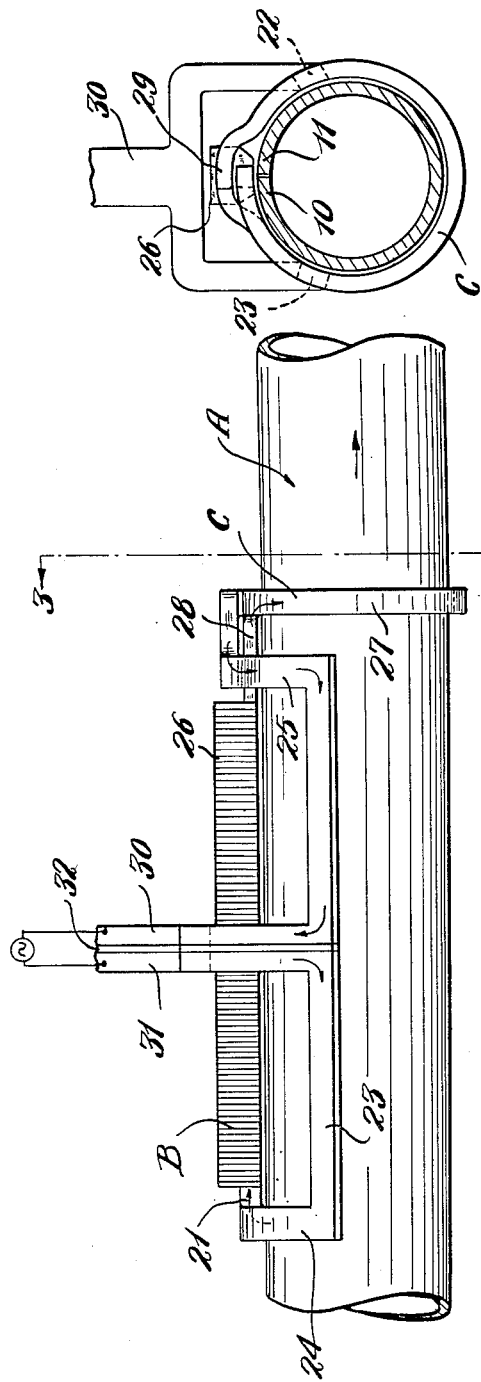
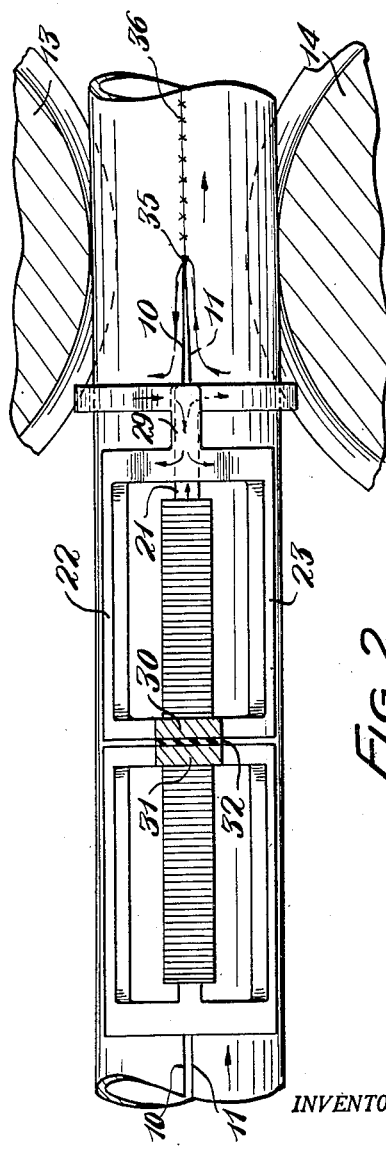
INVENTOR.
Alfred C. Body March 17, 1953     A. C. BODY     2,632,079
MEANS AND METHOD FOR ELECTRIC SEAM WELDING
Filed Nov. 30, 1950     3 Sheets-Sheet 2
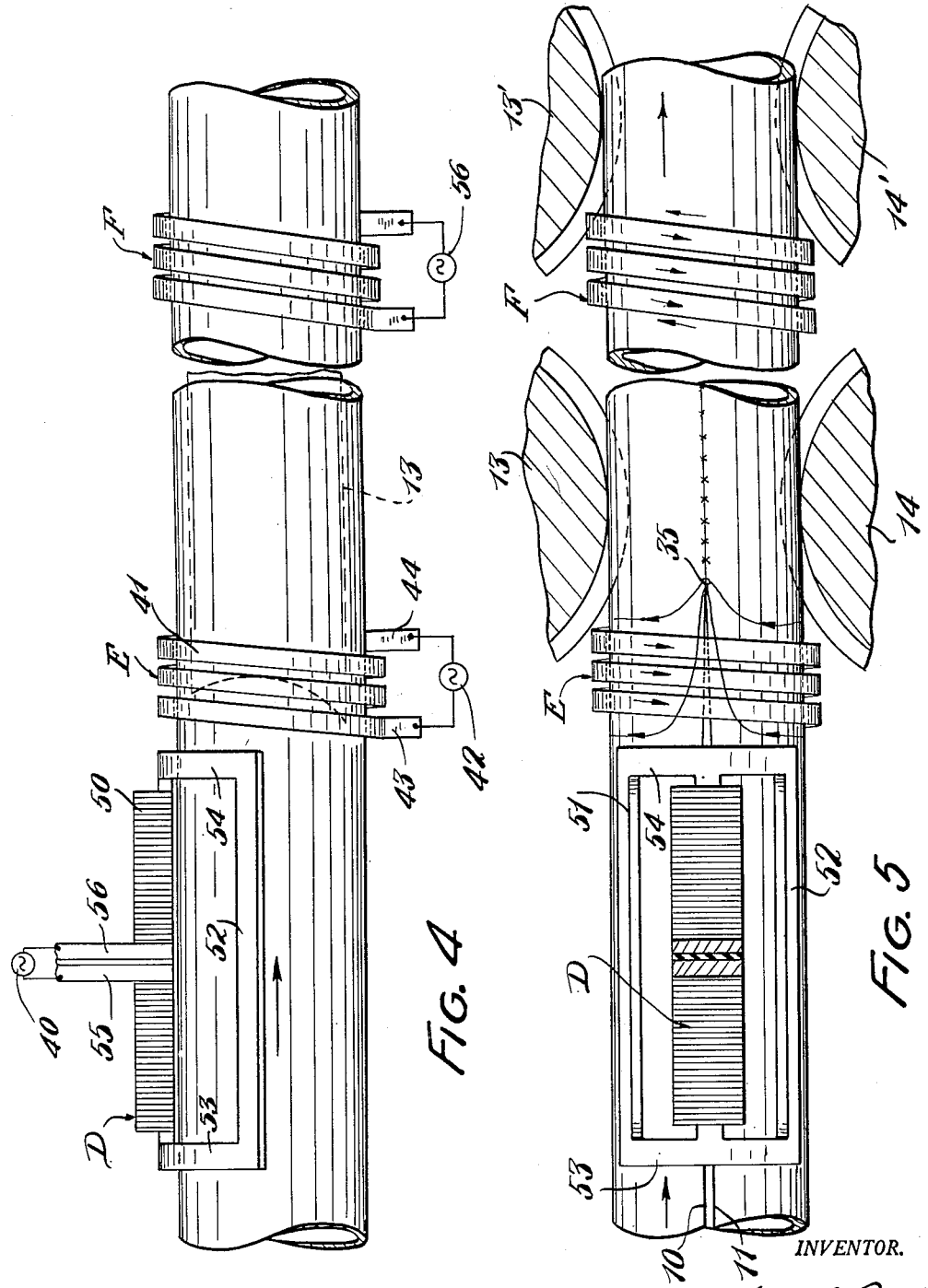
INVENTOR.
Alfred C Body March 17, 1953  A. C. BODY  2,632,079
MEANS AND METHOD FOR ELECTRIC SEAM WELDING
Filed Nov. 30, 1950  3 Sheets-Sheet 3

INVENTOR.
Alfred C. Body

Patented Mar. 17, 1953

2,632,079

UNITED STATES PATENT OFFICE 2,632,079

MEANS AND METHOD FOR ELECTRIC SEAM WELDING

Alfred C. Body, Cleveland, Ohio, assignor to The Ohio Crankshaft Company, Cleveland, Ohio, a corporation of Ohio Application November 30, 1950, Serial No. 198,453

12 Claims. (Cl. 219—6)

This invention pertains to the art of seam welding of metals and, more particularly, to a means and method for electrically heating edges of metallic members to be welded.

The invention is particularly adapted to the heating of the opposed edges of a generally C-shaped metallic tube for welding the edges to form a closed tube or pipe and the invention will be described with particular reference to such an application, although it will be appreciated that it obviously has other applications.

In the art of welding the edges of a C-shaped tube into pipe, there are generally two known ways of employing electrical currents to effect the heating of the edges to the necessary welding temperatures; namely, what may be termed as "resistance heating" wherein the edges are brought into pressure engagement and an electric current is passed between the edges to raise their temperature to the welding temperature and what may be termed as "induction heating" wherein the edges are heated by electric currents caused generally by induction to flow along the edges, or at least without current flow across the edges, prior to the bringing of the edges into welding engagement.

There are normally two ways of causing the current flow in resistance heating. One of these may be termed "contact resistance heating" and, generally, in this method, a pair of rolls engage the external surfaces of the tube, one adjacent each edge. These rolls are electrically energized from a suitable power source and cause a high-density current to flow between and rapidly heat the edges. The rolls may also serve the purpose of bringing the edges into the necessary pressure engagement. The other method of causing the current flow in resistance heating is to employ what may be termed as "induction resistance heating" wherein the tube is surrounded by an induction coil forming a primary of a transformer and the tube acts as a single-turn secondary of the transformer such that, when the edges are brought into engagement, a high-density current will flow across and heat the edges, the tube then serving as a shorted secondary turn of the transformer.

Resistance heating has been employed extensively in the art of seam welding even though it has certain undesirable characteristics. The heating and final weld must be effected in an extremely short length of the tube and extremely high electrical currents must be employed. Thus, an electric arcing between the edges as they are brought into welding engagement occurs. This arcing tends to cause a pitting and to cause occlusions in the weld. This arcing may, in part, be attributed to minute irregularities in the surfaces to be welded which cause improper electrical contact as the surfaces to be welded are brought into current-carrying engagement. Burning and overheating of the metal also occur.

It has been found that with resistance heating, there is a tendency to heat the whole circumference of the tube in the vicinity of the weld. With contact resistance heating, the current may flow in two directions; one across or between the edges to effect the desired heating and, secondly, in the opposite direction around the uninterrupted portion or backside of the tube to effect a heating there. With induction resistance heating, the same currents which flow in the edges also flow in the backside.

In both cases of resistance heating, the theory is that the abutting edges will have a higher resistivity measured in a circumferential direction; i. e., between the edges, than will the uninterrupted circumferential portion of the tube and that the currents will heat principally where the resistivity is higher. However, it has been found that, in practice, when the edges are brought into abutting relationship with the kind of pressure required to effect the final weld, the resistivity of the abutting edges is actually almost the same as the resistivity of the uninterrupted portion of the tube. The desired localized heating does not result. With contact resistance heating, the contacting rolls are placed in close-spaced relationship to the edges. They, themselves, bring the edges into abutting relationship. The circumferential distance between the rolls measured across the edges is much less than the circumferential distance between the rolls measured around the backside of the edges. For this reason, and not considering any possible change in resistivity caused by the abutting edges, the heating will primarily occur in the tube over the shorter circumferential length. In any event, there is an appreciable amount of heating in the backside of the tube caused by currents flowing in the opposite direction between the contacts circumferentially in the tube.

With the induction resistance heating, the same current must necessarily flow throughout the entire circumference of the tube; with the result that, if the resistivity of the abutting edges is substantially the same as that of the uninterrupted portion of the tube and the strip is at a completely uniform temperature at the time that the heating is commenced, the heating will occur generally over the entire circumference of the tube and the desired localized heating will not result. Although much development work has been done in the field of induction resistance seam welding, there are today no commercially practicable installations employing this method of heating the seam.

With all forms of resistance heating, a relatively large bead is normally formed due to the extremely high pressure which must be maintained between the edges in order that a sufficient current flow may be maintained therebetween.

With induction heating of the edges, the heating is normally accomplished using induced high-frequency electric current concentrated in the edges only. A high-frequency inductor is so constructed and arranged as to rapidly heat only the edges, while in spaced relationship, to the forge-welding temperature. With this type of heating, the heating is normally completed before the edges enter the welding rolls to be brought into welding engagement. Because of this, there is a slight cooling of the edges during the slight interval between leaving the high-frequency inductor and entering the welding rolls. This slight cooling, to some extent, interferes with the obtaining of a perfect weld. Further, with this type of heating, there is only a narrow temperature range which will produce a perfect weld. If the temperature is too high, the edges tend to melt and drip away, thus changing the pressure at which the edges are brought into welding engagement. If the edges are not heated to a sufficiently high temperature, either no weld or a very poor weld results.

The present invention contemplates a method and apparatus which overcomes or eliminates the above referred to difficulties of the prior art. The invention, in its broader aspects, comprises the method of preheating the edges only, using induction heating, and then bringing the edges into engagement and, simultaneously, passing electric current between the edges to raise them to the final welding temperature. In accordance with the present invention, it is important that only the edges be heated and that they be heated a substantial amount generally just short of the temperature at which the welding will take place for the particular type of metal employed. For low-carbon steels, this temperature will normally be in excess of 2,000° F. Other metals will involve other temperatures. The electric currents passing between the edges as they are brought into engagement then generate enough additional heat to raise the edges to the final and desired welding temperature.

Due to the preheating of the edges only, the electrical resistivity at the edges is much higher than elsewhere in the tube and uniform circumferential currents in the tube effect a nonuniform heating much greater at and adjacent the edges than elsewhere. Further, these currents are introduced into the tube in such a manner as to concentrate at the edges at the point of contact and to be relatively evenly distributed elsewhere.

For example, in accordance with a preferred embodiment of the invention, slightly-spaced edges of a low-carbon strip are heated to 2,200° F. employing induction heating of the edges. A voltage difference is then effected between the edges by employing the tube as a secondary of an induction-coil primary. These heated edges with the voltage difference therebetween are then brought into engagement by welding rolls and an electric current sufficient to raise the temperature of the edges to approximately 2,400° F. passes through the edges. This current normally concentrates at the first point of contact of the edges, thus giving very localized heating action further emphasized by the fact that the edges are already at an elevated temperature and, therefore, have a higher resistivity than the remainder of the tube.

By following the teachings of the present invention, the currents for the resistance heating can be far lower than that ever heretofore employed to effect resistance welding. Because of this lower current, the arcing and pitting heretofore experienced will not occur. Further, the edges, due to the high temperatures, will be relatively plastic and the point contacts between the edges as they are brought into engagement will not be objectionable. Also, because of the higher temperature, far lower pressures may be used to effect the welding with a resultant smaller bead.

To effect the preheating of the edges, it is preferred to use high-frequency inductors of the type described in the copending applications of Phillips N. Sorensen, Serial No. 58,228 filed November 4, 1948, and Serial No. 86,066 filed April 7, 1949, owned by the assignee of this application. The edges may be heated while the tube is still flat strip before forming.

Any of the known methods for causing currents to flow between the edges to effect resistance heating may be employed, such as contact resistance heating or induction resistance heating, the latter being preferred. With contact resistance heating, it will be appreciated that because the edges are already heated to an elevated temperature, the resistivity of the metal immediately adjacent the heated edges and the resistance of the contact between the edges will be much higher than the uninterrupted or remote portion of the pipe and as these two portions are in electrical parallel relationship with the contacts, a greater amount of heating will tend to occur in the uninterrupted portion. For this reason, it is preferred to employ induction resistance heating. Here, the highly heated edges and the contact between the edges are in series electrical relationship with the uninterrupted portion of the pipe. The resistivity of the heated edges and the resistance of the contact between the edges will obviously be much higher and, in some cases, ten to twelve times higher than the uninterrupted portion of the tube and the current flowing circumferentially in the tube will, in effect, cause a selective heating at and immediately adjacent the edges in contact.

In accordance with a preferred embodiment of the invention, a continuous length of a C-shaped tube with spaced edges is progressively advanced underneath an inductor of the type described in the above referred to Sorensen application but modified so that the currents flowing in the inductor make a complete loop in one direction only around the tube adjacent the exit end of the inductor and before the edges are brought into engagement. Thus, the same high-frequency currents are employed to both preheat the edges only by induction and to effect a final resistance heating of the edges. Alternative preferred embodiments may employ independent coils positioned adjacent the exit end of the high-frequency inductor either energized from a high-frequency power source or from a conventional low-frequency source such as 60 cycles A. C.

The primary object of the invention is the provision of a new and improved apparatus for heating the edges of metallic members to a pressure-welding temperature which is simple and positive in operation, electrically efficient, rugged in construction and which will permit improved seam welds at extremely high speeds.

Another object of the invention is the provision of a new and improved method of heating the edges of metallic members to the pressure-welding temperature which is efficient electrically, readily controlled and which enables extremely high-speed seam welds to be obtained.

Another object of the invention is the provision of new and improved apparatus for effecting seam or butt welds between the edges of metallic members which comprises, in combination, apparatus for heating the edges only of the metallic members to approximately the pressure-welding temperature with other apparatus for causing the flow of current between the edges to increase their temperature a further desired amount.

Yet, another object of the invention is the provision of a new and improved apparatus for heating the edges of metallic members to the pressure or butt-welding temperature which comprises, in combination: a high-frequency inductor adapted to induce the flow of heating currents parallel to the edges and in the same direction to heat the edges to the vicinity of or to the pressure-welding temperature, and an inductor for causing the flow of current between the edges when they are brought into pressure-welding engagement.

Another object of the invention is the provision of a new and improved method of effecting a pressure or continuous seam weld between the edges of metallic members which comprises preheating the edges only of said member to a temperature in the vicinity of the pressure-welding temperature for the metal employed and bringing the edges into pressure engagement while simultaneously flowing currents between the edges to further raise the temperature of the edges to the desired welding temperature.

The invention will be specifically set forth and defined in the several claims appended to the end of this specification. It may be embodied in certain arrangements of parts and combinations of parts, all differing radically in appearance. Preferred embodiments of such arrangements will be described in detail in this specification and illustrated in the attached drawings which form a part hereof, and wherein:

Figure 1 is a side elevational view of a high-frequency inductor embodying the present invention and capable of carrying out the present invention;

Figure 2 is a top elevational view of Figure 1;

Figure 3 is a sectional view of Figure 1 taken approximately on the line 3—3 thereof;

Figure 4 is a view similar to Figure 1 but showing a modified embodiment wherein the inductor for preheating the edges is energized separately from the inductor for the resistance heating of the edges;

Figure 5 is a top elevational view of Figure 4;

Figure 6:
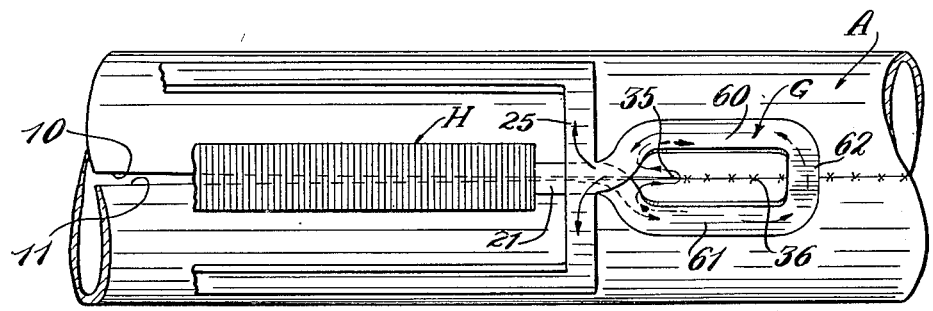
Figure 6 is a view similar to Figure 2 but showing a still further modification of the preferred embodiments.

Referring now to the drawings wherein embodiments are shown for the purposes of illustration only and not for the purposes of limiting the invention, Figures 1, 2 and 3 show a tube A formed by rolling or bending flat strip or sheet so that opposite edges 10, 11 of the strip or sheet are in close spaced opposed relationship. This tube A is moving from left to right through a welding machine not shown, except for a pair of welding rolls 13, 14 of conventional construction and, thus, shown schematically which engage the sides of the pipe to press the edges 10, 11 into pressure-welding engagement. A high-frequency inductor comprised of an edge-preheating portion B and an induction, resistance-heating portion C is shown just to the left of the welding rolls 13, 14 in induction-heating relationship with the tube A. This inductor both preheats the edges 10, 11 to a temperature just short of the pressure-welding temperature for the metal of the tube A and then induces currents to flow in the tube A, between the edges when they are brought together by the rolls 13, 14 to further increase the temperature of the edges to the necessary pressure-welding temperature.

In the embodiment of the invention of Figure 1, the edge-preheating portion B of the inductor generally comprises three parallel-extending electrical conductors, a central conductor 21 and a pair of side conductors 22, 23. The central conductor 21 extends in close spaced parallel relationship with the edges 10, 11 and is symmetrically positioned relative thereto. The side conductors 22, 23 are equally spaced on either side of the central conductor 21 and are in close spaced relationship with the sides of the tube A. The left-hand ends of the side conductors 22, 23 are connected to the left-hand end of the central conductor 21 by an end conductor 24, which conductor extends in an arcuate direction over the upper surface of the tube A. The right-hand ends of the side conductors 22, 23 are connected together by means of an arcuately-extending end conductor 25 which, in the embodiment shown, passes over and in spaced insulated relationship to the right-hand end of the central conductor 21.

The central conductor 21 is provided along its length between the end conductors 24, 25 with a stack of magnetically-permeable laminations 26 having their plane transverse to the length of the conductor 21. These laminations cover the surface of the central conductor 21 remote from the tube A and the two sides thereof.

The induction, resistance-heating portion C of the inductor comprises generally a conductor 27 in the form of a loop which extends peripherally or circumferentially around the outer surface of the tube A to the right of the right-end conductor 25 and to the left of the welding rolls 13, 14. The internal diameter of the loop is preferably just slightly larger than that of the outer diameter of the tube A so as to give a maximum degree of electrical coupling between the conductor and the tube A.

One end of the conductor 27 connects to a longitudinal extension 28 of the central conductor 21 while the other end of the conductor 27 radially overlaps the first end in spaced insulated relationship and connects to the end conductor 25 by means of a short conductor 29. It will be noted that the loop conductor 27 is spaced from the end conductor 25 in order that the magnetic fields of the two will not oppose each other. The inductor of Figures 1 to 3 may be energized from a high-frequency source in any desired manner. In the embodiment shown, however, the side conductors 22, 23 are split midway along their length and fishtail leads 30, 31 connect to both sides of the split and extend away therefrom in spaced parallel relationship. As shown, these fish-tail leads are insulated by electrical insulation 32.

It will be appreciated that the fish-tail leads could be located elsewhere. For example, the conductor 29 could be split and the fish-tail connections made there. Also, the fish-tail connections can be made in the central conductor 21, although this is generally not desirable.

In Figure 2, the edges 10, 11 are shown in somewhat exaggerated form as entering under the inductor in slightly-spaced relationship and as remaining in such spaced relationship while under the inductor until the welding rolls 13, 14 press the edges into engagement as at the point 35 just to the right of the loop conductor 27; and, thereafter, the edges are welded as indicated by the line 36.

In operation, high-frequency currents flow through the inductors B and C generally as shown by the arrows. The central conductor 21 induces extremely high currents to flow along the edges 10, 11 and to be concentrated at the opposed surfaces. These currents tend to heat a very narrow band of the tube A immediately adjacent the edges. The return currents are spread out elsewhere in the tube A, the side conductors 22, 23 tending to aid in this spreading out of the current. The effect of heating only the edges 10, 11 while the remainder of the tube remains relatively cool is to radically increase the electrical resistivity of the tube at and immediately adjacent the edges, this increase in resistivity for low-carbon steel being, for a temperature differential of 2,000 to 2,200° F., on the order of ten times. As the currents induced to flow in the edges are, at any one instant, in the same direction, the voltage difference between the edges will be zero for a perfectly balanced arrangement. Thus, even if the edges should touch, no current would flow from one edge to another.

On the other hand, the tube A acts like a one-turn secondary of a transformer with the loop 27 acting as the primary. Thus, because of currents flowing in the conductor 27, a voltage will be generated and exists between the edges 10, 11. However, the edges are in engagement at the point 35 and thereafter to the right. Thus, the voltage generated between the edges by the conductor loop 27 will create a current which, because of the proximity effect of the conductor 27, will tend to be concentrated under or near the conductor 27. The currents will leave the proximity of the loop 27 near the edges to flow around and through the point 35. Thus, a circumferential current flow is obtained generally under the conductor 27 for the principal portion of its length. The loop 27 is to the left of the point 35. As the current flow nears the edges 10, 11, it spreads out and flows axially along the tube A to the right to the point 35 where it flows between the edges and repeats its course down the other side of the tube A. It will be seen then that a one-turn series circuit exists having portions of different resistivity; namely, the unheated portions of the tube, the heated edges and the contact resistance of the edges. Because of the greater resistivity of the preheated edges over the unheated portion of the tube, the effect will be a greater or selective additional heating of the edges 10, 11 as they are brought into pressure engagement at the point 35. Thus, the currents generated by the conductor 27 will tend to generate a much larger amount of heat per unit of length of travel adjacent the edges than remote therefrom. Due to the current-flow pattern, a concentration of current occurs at the point 35, giving an even greater concentration of heating at the exact point desired.

The invention may, thus, be said to be, a selective preheating of a narrow portion of a metallic member so that a subsequent current flowing through the entire article will selectively additionally heat the preheated portion to a greater degree than the previously unheated portion and/or so locating the source of this current flow as to cause a concentration thereof at the edges when they come into contact.

Figures 4 and 5 show an alternative embodiment of the invention. Here, a preheating inductor D is shown which is complete unto itself and energized from a source of alternating-current energy, preferably high-frequency, 40. An induction, resistance-welding inductor E is positioned immediately to the right of the exit end of the preheating inductor D and to the left of the rolls 13, 14 and the point 35. This inductor is energized from a separate source of alternating current energy 42 which may be high frequency or low frequency.

In this embodiment, the preheating inductor D shown is identical to the above referred to Sorensen application, Serial No. 86,066 filed April 7, 1949 and comprises a main or central heating branch 50 and a pair of side conductors 51, 52 extending parallel to the main conductor 50. These three conductors are connected in parallel relationship by end conductors 53, 54. In this embodiment, the central conductor 50 is split at the middle and fish-tail leads 55, 56 are connected to the conductor on opposite sides of the split and lead to the power source 40.

The inductor E is comprised of a plurality of turns; in this case, three, of a peripherally-extending conductor 41, having terminals 43, 44 connected to the power source 42. The action of the inductor E is substantially identical to the action of the inductor C referred to in the preferred embodiment. The currents induced by this inductor E flow circumferentially around the pipe and, as the inductor is located preferably to the left of the point 35 where the edges are first brought into contact, the induced currents must flow somewhat longitudinally of the tube in the preheated edges and then between the edges where they come into contact at the point 35 and just to the right thereof. The effect is to provide a concentration of current flow at the point 35. Elsewhere, due to the proximity effect of the inductor, the currents will be relatively spread out and will, therefore, effect a minimum amount of heating. The resistivity of the preheated metal adjacent the point 35 is in excess of ten times the resistivity of the metal elsewhere peripherally around the tube A and the currents will effect a much greater heating at and adjacent the point 35 than elsewhere in the tube A.

As a further alternative, a second induction, resistance inductor F is shown positioned between the welding rolls 13, 14 and welding rolls 13', 14'. This inductor may be similar in construction to the inductor E and induces a current flow circumferentially of the pipe. Due to the higher resistivity of the metal along the weld line, there will be a selective heating on this line to further soften these welded edges so that the rolls 13', 14' may further press the edges into welding engagement. The coil F may be energized from any suitable source of alternating current; but, in the embodiment shown, a separate source 45 is shown. This inductor may be omitted in some instances.

Figure 7:
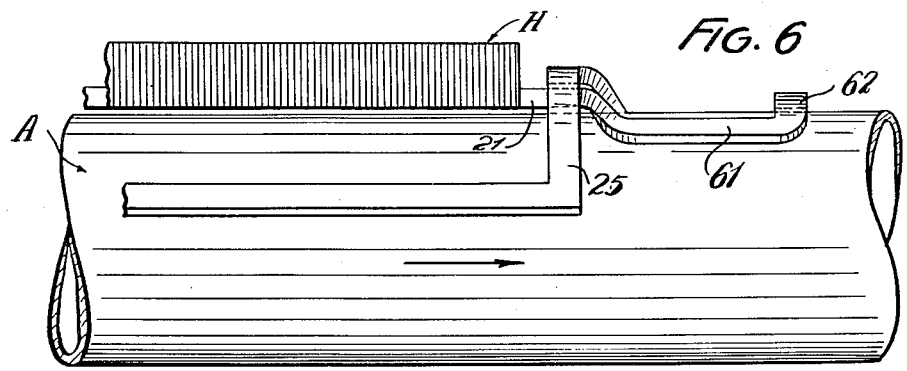
Figure 7 is a side elevational view of Figure 6.

Figures 6 and 7 show a still further modification of the preferred embodiment shown in Figures 1 to 3. In these figures, an induction resistance-heating inductor G is comprised of a rectangular, pancake-type coil positioned to the right of a preheating inductor H identical to the inductor D. This inductor G is comprised of a pair of long parallel side legs or conductors 60, 61 and an end leg or conductor 62 which is slightly curved so that the inductor may closely straddle the upper surface of the tube A with the long axis thereof extending parallel to the edges 10, 11. The right-hand conductor 62 of this inductor crosses the edges 10, 11 to the right of the point 35 where the edges come into contact. The left-hand end of the legs 60, 61 connect respectively to the central conductor 21 and the end conductor 25. The effect of this inductor is to induce a loop of current flowing in the upper surface of the tube A, the left-hand end of which loop tends to be crowded through the first point of contact 35. Thus, the currents induced by this inductor will be forced to concentrate at the point 35 as they cross from one edge to the other, again effecting a principal heating action at this point and this point only. The inductor G may be separately energized and/or comprised of a plurality of turns.

Figure 8:
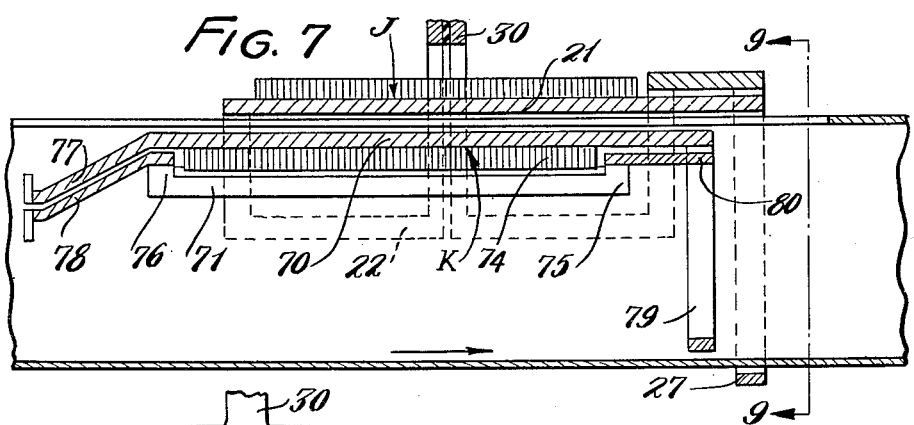
Figure 8 is a side cross-sectional view of Figure 1 showing a still further modification of the invention.
Figure 9:
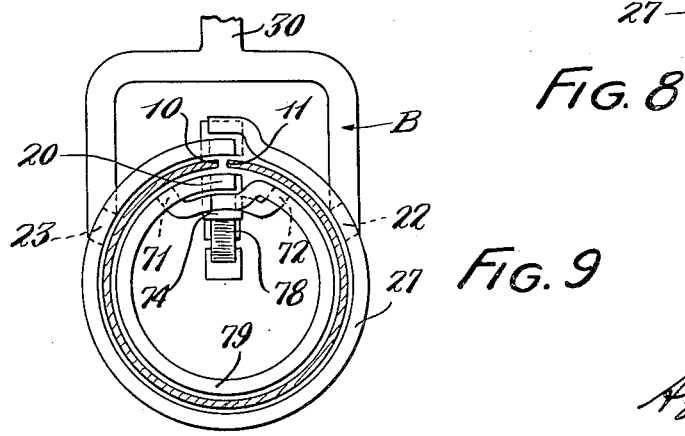
Figure 9 is a sectional view of Figure 8 taken approximately on the line 9—9 thereof.

Figure 8 shows a still further modified embodiment of the invention illustrating how the invention may be applied where the internal diameter of the tube A is sufficiently large to receive an internal inductor and generally where the thickness of the metal of the tube is such that an internal inductor must be employed to obtain even heating over the entire width of the edge 10, 11. In this embodiment of the invention, an external inductor J identical to the inductor B of the preferred embodiment is employed. An inductor K is positioned interiorly of the tube A and generally aligned with the exterior inductor J. The interior inductor K is much similar in construction to the exterior inductor except for such modifications required by the restricted space and the need for energizing the inductor from one end rather than centrally. Thus, the inductor K comprises three parallel-extending conductors, a main or central conductor 70 and a pair of side conductors 71, 72. The main or central conductor 70 is provided with a stack of laminations 74, the plane of which is transverse to the length of the conductor. At the right-hand end, the side conductors 71, 72 are connected together by an end conductor 75 which extends arcuately between the two conductors and in spaced insulated relationship under the main conductor 70. In a like manner, the left-hand ends of the side conductors 71, 72 are connected together by an end conductor 76 extending arcuately and under the left end of the central conductor 70. In this embodiment, fish-tail leads 77, 78 connect respectively to the left end of the central conductor 70 and the end conductor 76. The fish-tail leads are provided with the usual terminal blocks so that the inductor may be connected to a source of high-frequency power.

The internal inductor K is also provided on its right-hand end with a loop or coil 79, one end of which connects by means of a short conductor 80 to the right-hand end conductor 75 while the other end of the loop 79 connects to the central conductor 70.

The two inductors are energized so that the currents in the central conductors 21 and 70 are, at any one instant, flowing in the same direction and so that the currents in the side conductors are also flowing, at any one instant, in the same direction although opposite to that of the central conductors. The direction of the current flow in the loops 79 and 27 is also in the same direction.

As heating is desired at the edges only, the principal conductors 21 and 70 are positioned directly opposite and in symmetrical relationship to the edges and, thus, directly opposite each other. However, as heating in the tube is not desired opposite the side conductors and opposite the loops 27 and 79, these conductors are preferably offset relative to each other. Thus, as shown in Figure 8, the loop 79 is spaced axially from the loop 27. In a like manner, the side conductors 22, 23 of the external inductor are spaced a greater distance from their central conductor 21 than are the side conductors 71, 72 of the internal inductor, the result being that the side conductors 71, 72 are circumferentially offset from the side conductors 22, 23.

The axial spacing of the loops 27 and 79 does not effect the results which are desired therefrom because the currents induced by these loops flow axially of the tube at least to the point 35 where the edges are first brought into physical contact.

It will be appreciated that in all of the embodiments described, the induction resistance-heating inductor is normally intended to be energized by high-frequency electric currents. As such, these coils may be relatively simple in construction. However, the invention contemplates employing lower frequency currents in these inductors; in which case, more complicated structures would be required, including the use of magnetically-permeable laminations about the inductors and, in many cases, the use of more turns of conductor than that shown.

Also in all of the embodiments shown, relatively large currents are flowed through the inductors. In normal practice, the conductors forming the inductors would be hollow and water cooled. For the purpose of simplicity, however, the conductors shown in the drawing are shown as solid conductors. Obviously, if they were hollow and were to have cooling fluid circulated therethrough, suitable plumbing connections, as is conventional practice, would have to be provided.

The welding may be accomplished using alternating currents having a frequency in the vicinity of 10,000 cycles per second, which frequency can readily be supplied by rotating motor-alternator equipment conventionally available. The invention is also applicable, however, to any other type of alternating-current power source.

Thus, it will be seen that embodiments of the invention have been described in detail which are capable of preheating the edges of the tube before welding to or adjacent the welding temperature so as to increase the temperature and the resistivity of the edges only and then passing an electric current between the edges as they are brought into abutting engagement to further increase the temperature of the edges and complete the weld.

While a plurality of embodiments of the invention have been described, it will be appreciated that other embodiments differing radically in appearance from those herein described will occur to others upon a reading and understanding of this specification and it is my intention to include all such modifications and alterations insofar as they come within the scope of the appended claims.

Having thus described my invention, I claim:

1. The method of welding the edges of a C-shaped tube together so as to produce pipe which comprises heating the edges while in slightly-spaced, relatively-insulated relationship without the flow of electric current between said edges so rapidly that other portions of the tube do not become appreciably heated, bringing said edges into electrical and pressure contact and flowing electric currents between said edges to further raise the temperature of the edges and effect a weld.

2. The method of heating the edges of a C-shaped tube for the welding of the edges into pipe to produce pipe which comprises inducing concentrated alternating currents to flow parallel to said edges while they are in spaced, relatively-insulated relationship in such a concentrated manner as to rapidly heat said edges to increase their electrical resistivity relative to the adjacent circumferential portions of the tube, bringing said edges into electrical and pressure contact while simultaneously inducing alternating currents to flow circumferentially through said tube and between said edges to effect a selected heating at said edges due to the high resistivity of the edges because of the preheating.

3. The method of welding a C-shaped tube into a pipe which comprises heating the edges only of said tube while in relatively electrically-insulated relationship and without the flow of electric currents therebetween at such a rapid rate that substantially only the edges are heated to a welding temperature whereby the electrical resistivity of the tube in the vicinity of the edges is greatly increased relative to the remainder of said tube and then bringing said edges into pressure engagement while simultaneously flowing an electric current between said edges.

4. In the art of heating the edges of a C-shaped tube to the welding temperature, the combination of a pair of inductors, one of said inductors comprising an elongated conductor adapted to be disposed in close-spaced, parallel relationship to said edges, to induce a concentrated current flow parallel therein, said second inductor comprising a conductor arcuate at least in part and adapted to be disposed relative to said edges to cause a flowing of current thereacross when in engagement.

5. In the art of pressure welding the edges of a C-shaped tube, the combination of means for advancing said tube progressively in one direction, means for bringing said edges into pressure engagement, means for heating the edges of said tube while in spaced, relatively electrically-insulated relationship to the vicinity of the welding temperature before said tube reaches said means for bringing the edges into engagement and other means for flowing currents between said heated edges as they are brought into engagement by said means for bringing them into engagement.

6. In the art of heating the edges of a C-shaped tube and welding same to form a pipe, in combination, a means for advancing a tube progressively in one direction, roller means for bringing the edges into pressure engagement, elongated, relatively narrow high-frequency inductor means adapted to induce currents to flow parallel to said edges and to heat said edges only and other inductor means positioned between said high-frequency inductor means and said roller means for inducing currents to flow circumferentially in said tube and between said edges as they are brought into contact.

7. A high-frequency inductor particularly adapted for heating the edges of a C-shaped tube to the welding temperature, said inductor comprising an elongated relatively narrow straight conductor adapted to be disposed in close-spaced relationship to the edges to be heated and a second conductor in the shape of a loop adapted to be disposed around said tube to generate circumferentially-flowing currents in said tube and between the edges thereof when they are brought into electrical contact.

8. A high-frequency inductor for heating edges of a C-shaped tube for continuously seam welding same comprising, in combination, a straight elongated conductor adapted to be disposed in close-spaced parallel relationship to said edges and a loop conductor having portions extending transversely to said straight conductor adapted to be disposed in close-spaced relationship to said tube on both sides of said edges to induce a current flow between said edges, said conductors being in electrical series relationship.

9. In the art of heating the edges of a C-shaped tube and welding same to form a pipe, in combination, an internal and external inductor, each of said inductors including an elongated conductor adapted to be disposed respectively on the interior and exterior of said tube in close-spaced parallel relationship with said edges, each of said inductors also including a conductor loop disposed respectively interiorly of and exteriorly of said tube in spaced insulated relationship with the tube so as to induce currents to flow transversely of said edges.

10. The combination of claim 9 wherein said conductor loops are offset axially relative to each other.

11. The combination of claim 9 wherein at least one of said loops are in electrical series relationship with the respective elongated conductor.

12. The combination of claim 9 wherein at least one of said loops is energized independently of said elongated conductor.

ALFRED C. BODY.

REFERENCES CITED

The following references are of record in the file of this patent:

UNITED STATES PATENTS

| Number | Name | Date |
|---|---|---|
| 1,915,047 | Blakeslee | June 20, 1933 |
| 2,086,305 | Sessions | July 6, 1937 |
| 2,205,425 | Leonard, Jr. | June 25, 1940 |
| 2,371,459 | Mittelmann | Mar. 13, 1945 |
| 2,448,011 | Baker et al. | Aug. 31, 1948 |
| 2,448,062 | Stoltz | Aug. 31, 1948 |

FOREIGN PATENTS

| Number | Country | Date |
|---|---|---|
| 377,655 | Great Britain | (Open for inspection 1932) |